United States Patent [19]

Kasper

[11] 4,422,705
[45] Dec. 27, 1983

[54] CABLE STRAIN RELIEF FOR AN ELECTRICAL CONNECTOR

[75] Inventor: Alan H. Kasper, Cicero, Ill.

[73] Assignee: Allied Corporation, Morris Township, Morris County, N.J.

[21] Appl. No.: 291,352

[22] Filed: Aug. 10, 1981

[51] Int. Cl.³ ............................................. H01R 13/58
[52] U.S. Cl. ............................................. 339/103 M
[58] Field of Search ........................ 339/103, 105, 107

[56] References Cited

U.S. PATENT DOCUMENTS

| | | | |
|---|---|---|---|
| 4,195,899 | 4/1980 | Radloff et al. | 339/103 M |
| 4,211,463 | 7/1980 | Chandler | 339/103 M |
| 4,214,803 | 7/1980 | McKee et al. | 339/103 R |

Primary Examiner—Eugene F. Desmond
Attorney, Agent, or Firm—Roger H. Criss

[57] ABSTRACT

A strain relief system for an electrical connector having a housing with a mounting flange in which a cable clamp is mounted to the flange with a projection engaging the housing to resist bending of the flange.

11 Claims, 5 Drawing Figures

4,422,705

CABLE STRAIN RELIEF FOR AN ELECTRICAL CONNECTOR

BACKGROUND OF THE INVENTION

This invention relates generally to an improved electrical connector strain relief system and, more particularly, to an improved cable clamp secured to a mounting flange of the connector housing for resisting bending of the flange due to tension applied to a cable held by the clamp.

Many types of strain relief systems have been devised for use with multicontact electrical connectors terminating multiconductor cables. The present invention concerns an improved strain relief system which is particularly suited for use with multicontact connectors employed in the telecommunications field, such as Bunker Ramo Corporation's 57 SERIES and 157 SERIES electrical connectors. A representative one of these types of connectors typically comprises a two-piece, elongated, metallic shell, a dielectric insert housed within the shell, and a plurality of miniature, insulation piercing contacts along the elongated edges of the insert for terminating the individual conductors of the cable. Flange portions protruding from opposite ends of both shell pieces are fastened face-to-face to secure the shell pieces together and provide two-piece mounting flanges at both ends of the connector.

Because the cable terminated by the connector is often subjected to tugging and twisting which, left unchecked, can result in impairment of the individual conductor terminations in the connector, especially when the connector is not mounted on a support structure or otherwise supported, numerous strain relief systems have been devised to isolate the connector terminations from such forces. The majority of the designs which have been suggested and utilized in the past for this purpose fall into the following broad categories: (a) cable clamps which are attached to or form a part of a protective hood covering the connector; (b) cable clamps which rely on cooperation between such a hood and the connector housing; and (c) cable clamps which are attached to the mounting flange at one end of the connector.

The present invention is concerned with the last category of clamp designs, which function without assistance or interference by the connector hood. Typically, these clamps have comprised a base portion attached to the mounting flange by a rivet or the like and a cable gripping portion elevated with respect to the base portion for holding the cable securely relative to the connector. Although such flange mounted clamps offer many advantages due to other design considerations, the steel mounting flange is thin, e.g., each of the two shell flange portions comprising the mounting flange being only about 0.016 inches thick, and the two-piece mounting flange has been found to bend when pull-out forces as low as 16 pounds are applied to the cable. Thus, while the cable clamp is intended to provide strain relief, the deformation of the mounting flange, and the resultant displacement of the clamp with respect to the connector, may cause the clamp itself to pull the conductors from their contacts, thereby impairing the reliability of the terminations and hence the reliability of the connector.

SUMMARY OF THE INVENTION

Accordingly, it is an object of the present invention to provide an improved strain relief system for attachment to the thin metal mounting flange of an electrical connector in a manner which opposes tension applied to the cable while resisting bending of the mounting flange.

In accordance with the principles of the present invention, a strain relief system is provided for an electrical connector having a housing with a mounting flange wherein a cable clamp is attached to the mounting flange. Although the cable clamp is generally of a conventional configuration in which tension applied to the cable tends to bend the flange, in accordance with the teaching of the present invention, the clamp includes means engaging the housing for resisting bending of the mounting flange.

In one embodiment of the invention, the means engaging the housing comprises a projection of the clamp which extends into a slot near the base of the wall of the connector housing adjacent the mounting flange to resist bending of the mounting flange.

BRIEF DESCRIPTION OF THE DRAWINGS

The features of this invention which are believed to be novel and unobvious are set forth with particularity in the appended claims. The invention, together with its objects and advantages, may be best understood by reference to the following description taken in conjunction with the accompanying drawings in which like reference numerals identify like elements in the several figures and in which:

DESCRIPTION OF THE PREFERRED EMBODIMENT

Figure 1:
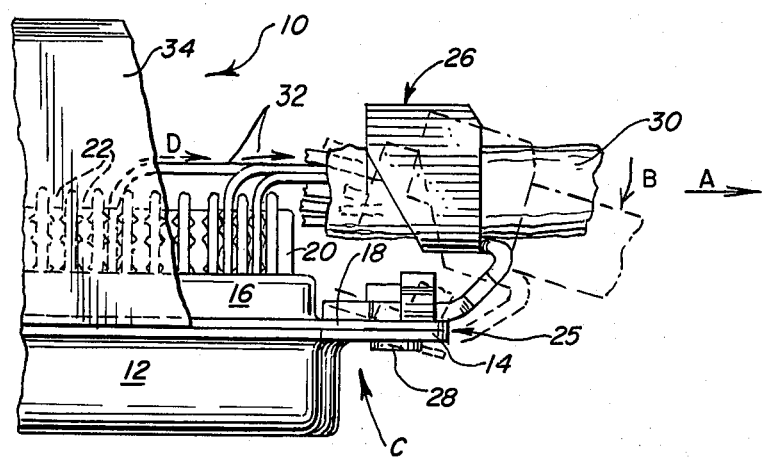
FIG. 1 is a partial side view of an electrical connector with a cable clamp mounted to the mounting flange of the connector according to the teaching of the prior art.

FIG. 1 illustrates the forces which may cause bending of the connector mounting flange in a prior art flange mounted cable clamp arrangement. In FIG. 1, the connector 10 is shown to include a connector housing comprising a lower shell piece 12 having a flange portion 14 and an upper shell piece 16 having a flange portion 18. A dielectric insert 20 is held within the housing with the portion of the insert extending above upper shell piece 16 having a plurality of contacts 22 mounted in adjacent channels therein. Flange portions 14 and 18 of the two shell pieces are fastened together and combine to provide a two-piece mounting flange, identified generally by reference numeral 25, to which a conventional cable clamp 26 is secured by a rivet 28.

A multiconductor cable 30 is captured by cable clamp 26 and held in a position elevated with respect to the plane of the mounting flange in order to position the individual conductors of the cable for termination to contacts 22. For purposes of illustration, representative conductors 32 are shown in FIG. 1 terminated to their corresponding connector contacts. A hood 34 protects the terminations from the environment, but does not function as part of the cable clamping system.

As previously stated, shell pieces 12 and 16 are generally formed from thin metal stock, and therefore, flange portions 14 and 18, which are integrally formed with the shell pieces and comprise mounting flange 25, are also thin. Thus, when the captured cable is subjected to pull-out forces, generally in direction A, a bending force or moment on the mounting flange results, generally in direction B. Bending force B, if of sufficient magnitude as a result of pull-out force A, will bend the mounting flange in region C where flange portions 14 and 18 project from the shell pieces, causing the more rigid cable clamp, and hence the cable, to be displaced downwardly to the position shown in ghost form in FIG. 1. This movement will, in turn, tend to pull the individual conductors of cable 30 in direction D, drawing them out of their corresponding contacts or otherwise damaging the conductor terminations. As explained earlier, this may impair the reliability of the conductor terminations and hence the reliability of the overall connector. It is therefore most important to prevent bending of the unsupported thin metal mounting flange bearing the cable clamp.

Figure 2:
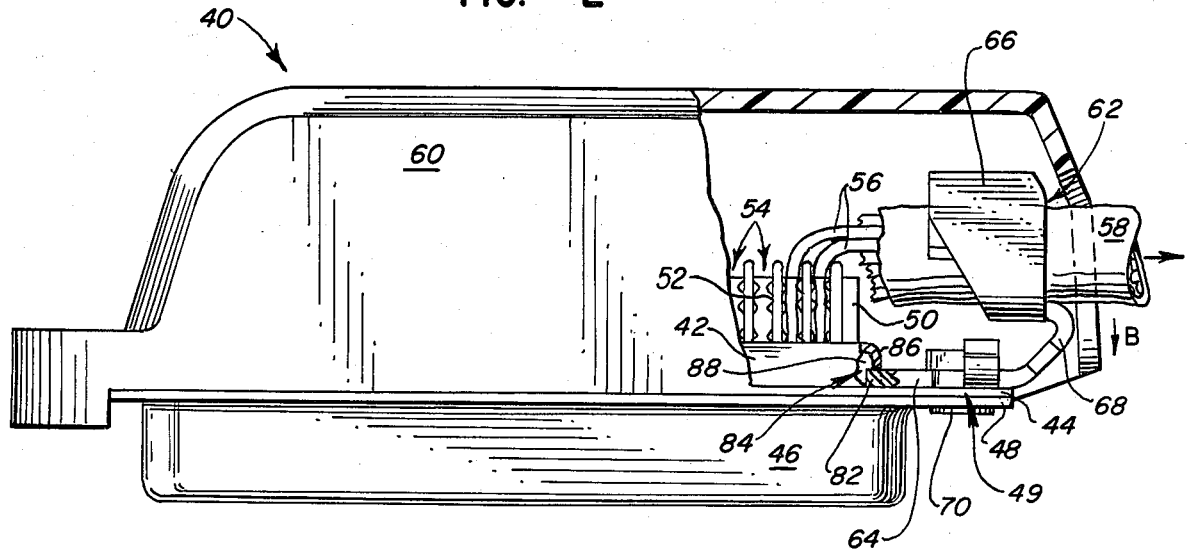
FIG. 2 is a side view of a fully assembled electrical connector having an improved strain relief system according to the teaching of the present invention, with a portion of the assembly partially broken away and sectioned to show a projection of the cable clamp extending into a slot near the base of the wall of the connector housing.

Turning now to FIG. 2, there is shown an electrical connector 40 having an improved strain relief system in accordance with the principles of the present invention. As in the prior art connector shown in FIG. 1, connector 40 includes a housing comprising an upper shell piece 42 with an integral protruding flange portion 44 at each end and a lower shell piece 46 with an integral protruding flange portion 48 at each end. In the present embodiment, shell pieces 42 and 46, including flange portions 44 and 48, which together comprise a two-piece mounting flange 49 at each end of the connector, are stamped and formed from thin sheet metal stock, typically about 0.016 inches in thickness. This thin gauge stock is utilized to facilitate the stamping process, and to help control both the expense and the weight of the overall connector. It should be understood, however, that in certain connectors a thicker sheet metal stock may be used, in which case one of the flange portions, 44 or 48, may be deleted so that the other flange portion alone serves as a mounting flange.

The shell pieces, in turn, house a dielectric insert 50 and are fastened together in any one of a number of known ways. Insert 50 includes a plurality of miniature contacts 52 aligned in closely spaced channels 54 for receiving the appropriate conductors 56 of a multiconductor cable 58 therein and terminating the conductors to the connector. As in the prior art connector, a hood 60 mounts to the connector to protect the conductor terminations from the environment.

Figure 5:
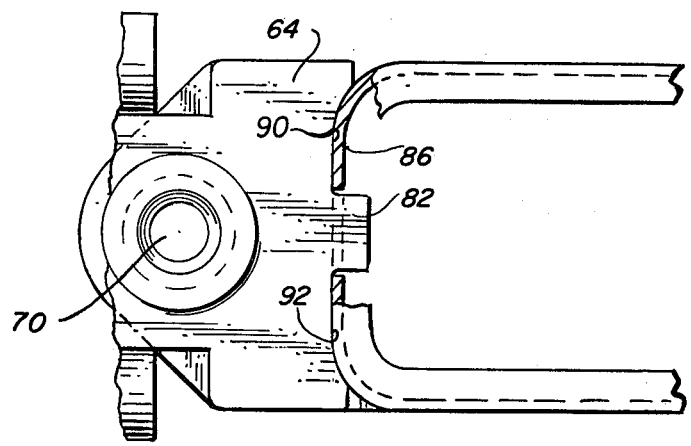
FIG. 5 is a fragmentary, top plan view of the cable clamp of FIG. 4.
Figure 3:
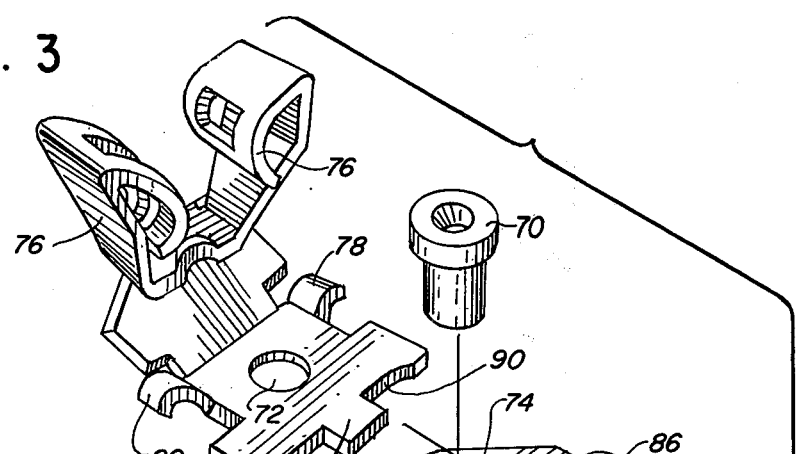
FIG. 3 is an enlarged fragmentary view of the cable clamp of FIG. 2 in which the cable clamp is shown prior to its assembly to the mounting flange of the connector.
Figure 4:
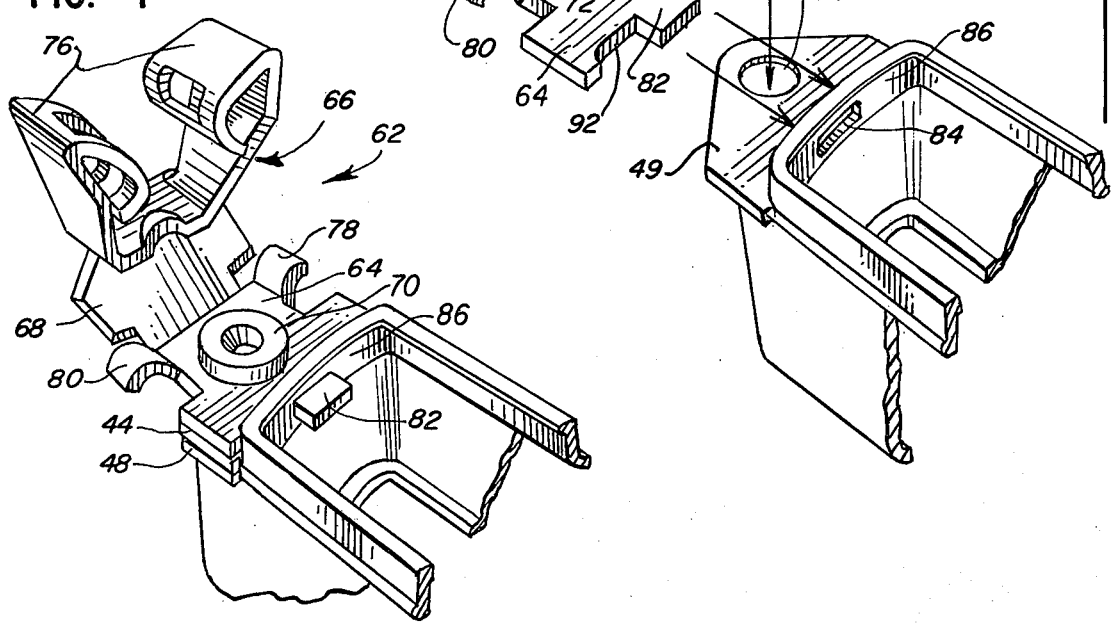
FIG. 4 is an enlarged fragmentary view of the cable clamp of FIG. 3 in which the clamp is mounted to the mounting flange of the connector.

With reference now also to FIGS. 3-5, the improved strain relief system of the present invention is embodied in a cable clamp 62 which cooperates with the connector housing to resist bending of mounting flange 49 to which the clamp is secured. More particularly, the cable clamp, which is stamped and formed from a single piece of sheet metal stock, is generally L-shaped, having a base portion 64 defining the bottom of the "L", a cable gripping retention portion 66 at the top of the "L", and a sloped intermediate portion 68 joining the base portion and the cable retention portion. The cable clamp, in turn, is assembled to the connector by a rivet 70 which passes through aligned apertures 72 and 74 in base portion 64 of the clamp and in connector mounting flange 49, respectively, to secure the clamp to the connector.

Retention portion 66, which is also of conventional design, is initially open to receive cable 58 without significant interference. Thereafter, the side walls 76 of the retention portion are pinched together to capture the cable and provide strain relief therefor. Cable retention portion 68 thus supports cable 58 in an elevated position with respect to base portion 64 to facilitate termination of the individual cable conductors to the appropriate contacts.

Hood 60 is then installed on the connector. To this end, base portion 64 has latch arms 78 and 80 which extend from opposite sides thereof to engage the inside of the hood, camming the hood sides outwardly as the hood is pressed onto the connector until the latch arms snap into corresponding slots (not shown) on either side of the hood. The opposite end of the hood is secured to the connector by any one of a number of known means.

While the cable clamp and the connector heretofore described are typical of such devices found in the prior art, in accordance with the principles of the present invention, cable clamp 62 further includes means engaging the connector housing for resisting bending of mounting flange 49 due to excessive tension applied to the cable.

In the present embodiment, this takes the form of a projection, or tongue, 82 which is formed with and extends from base portion 64 of the clamp toward the connector housing. Upper shell piece 42 of the housing, in turn, has a slot 84 in an end wall 86 thereof located adjacent flange portion 44 of the mounting flange, the slot being dimensioned and configured to accommodate projection 82 when the cable clamp is assembled to the connector. As may be seen in FIG. 2, a recess 88 in dielectric insert 50 provides clearance for the portion of projection 82 extending through slot 84.

Accordingly, when tension such as pull-out force A is applied to the cable held in cable gripping retention portion 68 of the clamp, resulting in a bending force or moment B being applied to the mounting flange, projection 82 bears against the edge of slot 84 in end wall 86, and the bending force B is distributed across the mounting flange between rivet 70 and the housing wall against which projection 82 bears to resist bending of the flange.

Finally, base portion 64 of the cable clamp also includes a pair of shoulders, 90 and 92, on opposite sides of projection 82. These shoulders are configured to abut the periphery of end wall 86 and further resist twisting of the cable clamp about rivet 70 when pull-out force A includes laterally-directed components.

While particular embodiments of the present invention have been shown and described, it will be obvious to those skilled in the art that changes and modifications may be made therein without departing from the invention in its broader aspects, and therefore, the object of the appended claims is to cover all such changes and modifications which fall within the true spirit and scope of the invention.

What is claimed is:

1. A strain relief system for an electrical connector having housing means including a mounting flange, comprising:
 a cable clamp mounted on said flange for restraining movement of a cable connected to said connector; said cable clamp being configured such that tension applied to said cable tends to bend said flange; and said cable clamp including means engaging said housing means for resisting bending of said flange.

2. A strain relief system as set forth in claim 1 wherein said housing means comprise a shell with said flange extending therefrom, and said cable clamp is configured such that said cable is supported in a plane displaced from the plane of said flange.

3. A strain relief system as set forth in claim 2 wherein said shell includes a wall substantially perpendicular to the plane of said flange, and wherein the engaging means of said cable clamp engage said wall.

4. A strain relief system as set forth in claim 3 wherein said shell defines a slot near the base of said wall, said engaging means comprising a projection extending into said slot.

5. A strain relief system as set forth in claim 4 wherein said cable clamp is generally "L" shaped with the cable being supported near the top of the "L", the clamp being supported on said flange at the bottom of the "L" and said projection comprising the bottom of said "L".

6. A strain relief system for a multicontact electrical connector including a housing having a metal shell and a mounting flange extending substantially perpendicular thereto, comprising:
 a cable clamp mounted on said flange at a point displaced from said metal shell for supporting a multiconductor cable, said cable clamp being configured such that said cable is supported in a plane displaced from the plane of said flange and tension applied to said cable tends to bend said flange; and means on said cable clamp for engaging said metal shell to resist bending of said flange.

7. A strain relief system as set forth in claim 6 wherein said shell includes a slot adjacent to said flange, said engaging means comprising a projection extending into said slot.

8. A strain relief system as set forth in claim 7 including means for limiting twisting movement of said cable clamp.

9. A strain relief system as set forth in claim 8 wherein said limiting means comprise a shoulder on said cable clamp which abuts the periphery of said shell.

10. A strain relief system as set forth in claim 8 wherein said metal shell houses a multicontact insert which generally abuts the inside surface of the shell, said insert has a recess opposite said slot, and said projection extends into said recess.

11. A strain relief system for a multicontact electrical connector including a dielectrical insert held within a housing having a metal shell comprising upper and lower shell portions and a pair of corresponding abutting upper and lower mounting flanges extending substantially perpendicularly to the shell position, comprising:
 a cable clamp mounted on said flange pair and resting on said upper flange for supporting a multiconductor cable, said cable clamp being configured such that said cable is supported in a position displaced from the plane of said upper flange and tension applied to said cable tends to bend said flange pair; said upper shell including a wall substantially perpendicular to the plane of said upper flange with a slot near the base of said wall, said cable clamp including a projection extending into said slot to resist bending of said flange; and
 a shoulder on said cable clamp which abuts the periphery of said wall to limit twisting movement of said clamp.

* * * * *